April 27, 1943.   G. B. COOK   2,317,734
METHOD OF MAKING CORROSION RESISTANT BOTTOM SEAMS FOR TANKS
Filed Aug. 3, 1940
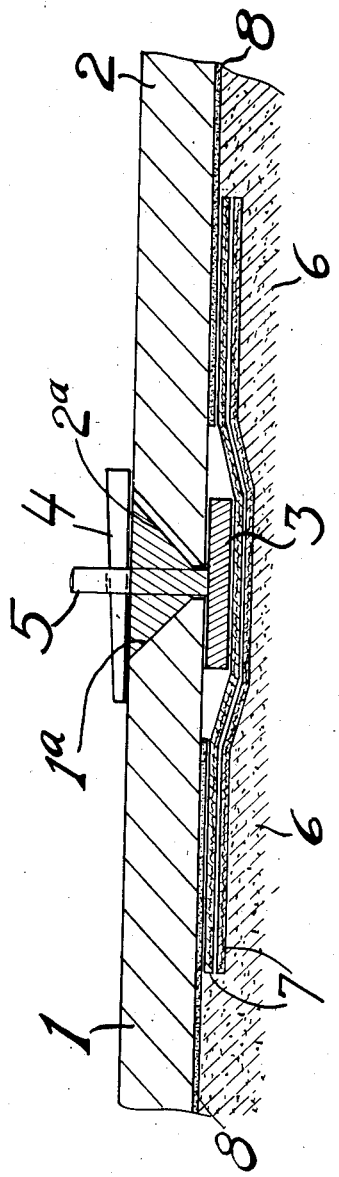
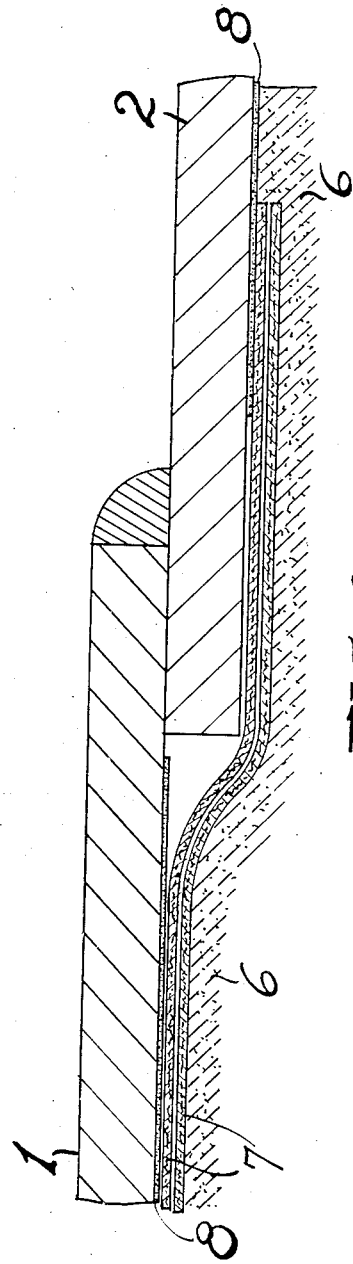
George B. Cook Inventor
By _____ Attorney Patented Apr. 27, 1943

2,317,734

UNITED STATES PATENT OFFICE 2,317,734

METHOD OF MAKING CORROSION RESISTANT BOTTOM SEAMS FOR TANKS

George B. Cook, Summit, N. J., assignor to Standard Oil Development Company, a corporation of Delaware Application August 3, 1940, Serial No. 350,413

4 Claims. (Cl. 29—148)

The present invention relates to a method for protecting welded seams from corrosion, and more particularly to the protection against corrosion of the under side of welded seams in storage tank bottoms where the coatings normally used cannot be applied after welding.

The invention may be fully understood from the following description when it is read in conjunction with the accompanying drawing in which Fig. 1 is a cross sectional view of a portion of a tank bottom showing a butt-joint seam, and Fig. 2 is a similar view showing a lap joint seam.

Where applicable in the description of the drawing the same numerals are used to designate like parts, and the numerals 1 and 2 designate the edge portions of two adjacent plate sections to be joined.

In Fig. 1, the plates 1 and 2 are disposed in edge to edge abutment with a small space between the beveled portions 1a and 2a, respectively. A backing strip 3 is disposed along the joint beneath the plate, and is held in close contact with the lower plate surfaces by means of wedge pins 4 passed through slotted openings in stud members 5 which are secured to the backing strip 3 at intervals substantially along its center line.

In making the joint illustrated in Fig. 1, a sand cushion shown at 6 is prepared to receive the tank bottom, and then one or more fairly wide sealing strips of a material such as heavy, asphalt-impregnated asbestos, or a material containing asbestos and impregnated with asphalt, are laid on the cushion along the proposed seam line and substantially centered with respect thereto. Such strips are indicated by the numeral 7. A narrower backing strip 3 of a material such as steel is laid above the sealing strips with the studs 5 centered on said seam line. The plate members 1 and 2 are then set down and a weld of suitable metal deposited in the wedge-shaped groove, after tightening the backing strip by means of the wedge pins 4. In making up the joint as shown, it is anticipated that, according to usual practice, the under surface of the plates 1 and 2 will be coated as at 8 with a corrosion resistant material such as asphaltum or an equivalent material to a line spaced from the edge portions 1a and 2a in order to prevent contamination of the weld. Therefore, the sealing strip 7 should be wide enough to lap over the terminal line of the coating 8 in order that the strips 7 may be intimately bonded to the metal of the plates by the fusing of the plate coating 8 with the material used to impregnate the sealing strips 7. Fusion is accomplished by the weight of the plates, and by the welding heat transferred through the plates and backing strip 3.

In Fig. 2, the sealing strips 7 are used alone, the backing strip 3 being unnecessary in this form of construction due to the overlapping relation of the plate edges 1 and 2.

It should be noted that it is not intended that the invention shall be limited by either the drawing or the description thereof, both provided for illustration, but only by the appended claims.

I claim:

1. A method of constructing non-corrosive bottoms of storage tanks, which, because of their size, are constructed at the permanent site of the tank, by welding metal plates together at such site, comprising coating adjoining bottom plates with a substantially non-corrosive heat and pressure fusible plastic material to a line spaced from the plate edge portions, depositing on a cushioned support for said plates, along their line of juncture, a seal of a fibrous material impregnated with a coating of a heat and pressure fusible material, and applying a metallic weld along said plate juncture with sufficient local application of heat to substantially fuse said seal to the fusible coating material on the under surfaces of said plates.

2. A method according to claim 1 in which the metallic weld is accomplished by first placing a metallic backing strip on top of said fibrous material, said backing strip being short of the line on the adjoining plates at which the said coating terminates and being held in position by perpendicular studs with wedges driven therethrough along the top surface of the adjoining plates, said underlying fibrous material underlapping on both sides the said coating material of the adjoining plates.

3. A method of constructing non-corrosive bottoms of storage tanks, which, because of their size, are constructed at the permanent site of the tank, by welding metal plates together, which comprises the placing of a laminated seal of heat resistant material impregnated with asphalt on a cushion for said tank bottom along the lines formed by the juncture of said plates, coating the bottom of said plates with asphalt to a line spaced sufficiently from the plate edge portions so that said asphalt will not contaminate the weld, said underlying impregnated seal being wide enough to underlap the coated portions of adjoining plates, and applying a metallic weld along said plate juncture with sufficient application of heat to substantially fuse said impregnated seal with said asphalt coating on the bottom of said plates.

4. A method of constructing non-corrosive bottoms of storage tanks, which, because of their size, are constructed at the permanent site of the tank, by welding metal plates together, which comprises the placing of asphalt-impregnated asbestos on a cushion for said tank bottom along the lines formed by the juncture of said plates, coating the bottom of said plates with asphalt to a line spaced sufficiently from the plate edge portions so that said asphalt will not contaminate the weld, said underlying asbestos impregnated with asphalt being wide enough to underlap the coated portions of adjoining plates, and applying a metallic weld along said plate juncture, said plates being of sufficient weight and the temperature of the weld being sufficiently high so that fusion of the asphalt coating and the asphalt-impregnated asbestos is accomplished by the weight of said plates and the heat of the weld.

GEORGE B. COOK.